(12) United States Patent
Jung et al.

(10) Patent No.: US 7,177,597 B2
(45) Date of Patent: Feb. 13, 2007

(54) SYSTEM AND METHOD FOR ASSIGNING CONTACT INFORMATION TO AN EXTERNAL DEVICE FOR COMMUNICATION PURPOSES USING A MOBILE DEVICE

(75) Inventors: Younghee Jung, Helsinki (FI); Harri Wikberg, Helsinki (FI); Fumiko Ichikawa, Espoo (FI); Petri Piippo, Karkkila (FI); Raphael Grignani, Helsinki (FI)

(73) Assignee: Nokia Corporation, Espoo (FI)

( * ) Notice: Subject to any disclaimer, the term of this patent is extended or adjusted under 35 U.S.C. 154(b) by 421 days.

(21) Appl. No.: 10/740,622

(22) Filed: Dec. 22, 2003

(65) Prior Publication Data

US 2005/0136901 A1 Jun. 23, 2005

(51) Int. Cl.
*H04B 7/00* (2006.01)
(52) U.S. Cl. ...................... 455/41.3; 455/41.2; 455/417
(58) Field of Classification Search ............... 455/41.2, 455/41.3, 417, 415, 414.1, 466; 379/142.01, 379/142.15, 142.16, 142.17
See application file for complete search history.

(56) References Cited

U.S. PATENT DOCUMENTS

| | | | | |
|---|---|---|---|---|
| 6,175,741 | B1 | 1/2001 | Alperovich | ................. 455/458 |
| 6,584,188 | B2 * | 6/2003 | Kim | ...................... 379/211.02 |
| 2001/0031633 | A1 | 10/2001 | Tuomela et al. | |
| 2002/0081937 | A1 | 6/2002 | Yamada et al. | ............. 446/175 |
| 2002/0082054 | A1 | 6/2002 | Keinonen et al. | ........... 455/567 |
| 2002/0115471 | A1 * | 8/2002 | De Loye et al. | ............ 455/552 |
| 2003/0222874 | A1 * | 12/2003 | Kong et al. | ................. 345/473 |

FOREIGN PATENT DOCUMENTS

EP 1 180 903 A1 2/2002

OTHER PUBLICATIONS

J. Bray et al., "Bluetooth 1.1-Connect Without Cables", Prentice Hall PTR., Upper Saddle River, NJ, USA, Second Edition 2002, Chapter 5, (ISBN 0-13-066106-6).

* cited by examiner

*Primary Examiner*—Matthew Anderson
*Assistant Examiner*—Lewis West
(74) *Attorney, Agent, or Firm*—Morgan & Finnegan, LLP

(57) ABSTRACT

A system enables a user to communicate with another person via an external device, e.g. an audio, video, display interface. The external device includes a short-range transceiver, a memory, and an output interface. The mobile device includes two network transceivers, typically a cellular transceiver and a short-range transceiver, typically Bluetooth. In operation, the user prepares and stores a list of external devices with assigned IDs. The user further stores a list of phone numbers (phone book information) of contacts on the cellular network associated with the external devices for delivery of messages to the selected external device(s). The mobile device scans the network, and detects messages from associated contact source(s). The messages are stored by the ID. When the mobile device is within the coverage area of the external device, the mobile device transmits the message (s). The external device interprets the message for output to the intended recipient.

30 Claims, 8 Drawing Sheets

TOY DISPLAY

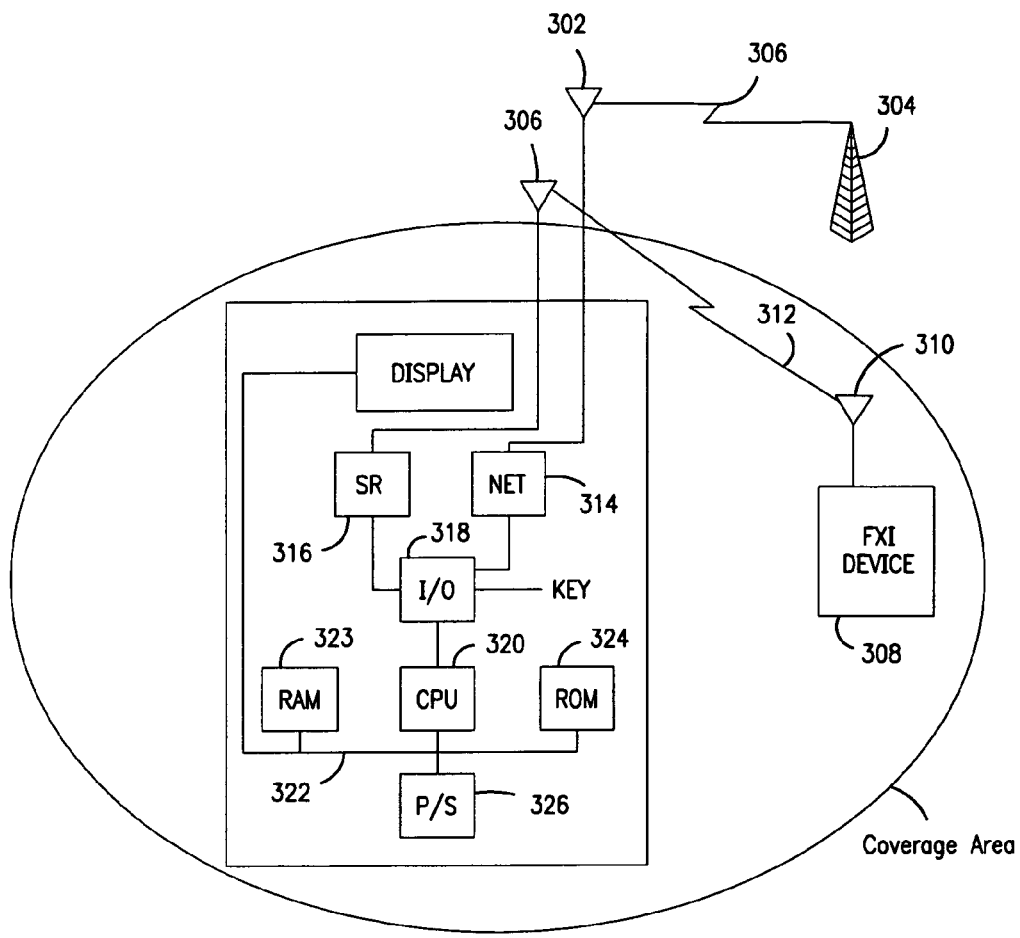
FIG. 3
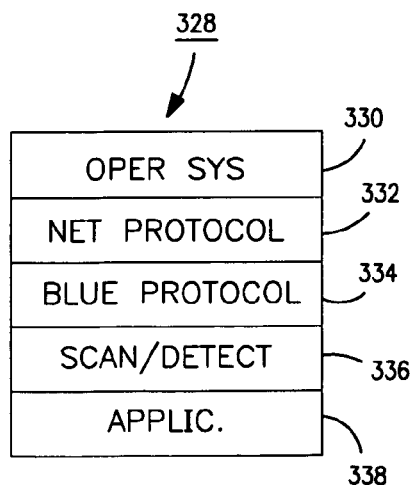
FIG. 3A      FIG. 3B

SYSTEM AND METHOD FOR ASSIGNING CONTACT INFORMATION TO AN EXTERNAL DEVICE FOR COMMUNICATION PURPOSES USING A MOBILE DEVICE

BACKGROUND OF INVENTION

1. Field of Invention

This invention relates to communication systems, methods and program products. More particularly, the invention relates to communication systems, methods and program products for assigning contact information to an External Device for Communication Purposes Using A Mobile Device

2. Description of Prior Art

In the future, people's relationship with and perception of the mobile phone may change from the current form of serving communication needs only to building or continuing relationships with others via the mobile phone. Already, many people are dependent on the mobile phones not only when they are out and about, but also as the constant personal contact. Some people disconnect their landline at home and rely solely on the mobile phone. Some operators have plans for offering one number that can be both the landline and mobile phone. It would be desirable to allow a user of a mobile phone to have additional and personalized means to observe or feel connected to a certain person(s) by linking communications from a contact source located on a network and associated with that person to an external device, which is capable of conveying the associated communication to the person by way of an interface, e.g. audio, video, display, etc. It would be desirable to identify external devices with an identification (Id) for delivery of messages collected by the mobile device from a network serving contact sources associated with the Id. It would be further desirable to assign a phone number(s) to the associated contact sources for detection of associated message (s) with at least one external device identified by an Id. It would be still further desirable to enable a mobile device to store messages associated with a certain person by Id for subsequent delivery to the certain person via an external device, when the mobile device was within the communication range of the external device.

Prior art related to communicating messages on a network associated with a person by way of external devices includes:

1) U.S. 20020082054 entitled "Mobile Emotional Notification Application", published Jun. 6, 2002, discloses an emotional notification system. Information about another party is entered into and stored in a terminal of a first party along with one or more data devices associated with the second party (such as an email from, to or about the second party, a file originated by the second party, etc.). Each time the first party activates his terminal through an interface module, a data device associated with a second party, i.e. a notifying message is sent to the second party to make the second party aware that the first party is devoting attention to the second party and to promote bonding between the two parties.

2) U.S. 20020081937 entitled "Electronic Toy", published Jun. 27, 2002, discloses an electronic toy which automatically activates when the user is nearby. The electronic toy is controlled so as to react to external information, and has a movement mechanism structuring the mechanical movement of the toy; an input element for obtaining external information; a distinction element for distinguishing whether an device body exists in the periphery; and a control element for selecting, among a plurality of control parameters. The control parameter controls the movement mechanism in correspondence with the external information based on the distinction result, and activates the mechanism when a person exists in the periphery.

None of the prior art discloses a mobile device (1) detecting and storing messages from a contact source on a network associated with a certain person for subsequent delivery to the certain person via an external device; (2) storing Ids of external devices for delivery of messages from contact sources associated with the Id on a network; (3) assigning telephone numbers or Internet addresses to contact sources for monitoring purposes, and (4) delivering messages from the contact sources to associated external devices for delivery to persons served by the external device, when the mobile device is within the communicating range of the external device.

INVENTION SUMMARY

A communication system, method, apparatus and program product enable a user to communicate with another person(s) via an external device, e.g. an audio, video, display interface. The user's communication with the person via the external device enables the user to "feel" in touch with the other person. The external device includes a short-range transceiver, a memory, appropriate software stored in the memory and an output interface, e.g. audio, video, display, etc. The interface serves as a dynamic bulletin board for communications received from the mobile device. The mobile device includes at least two network transceivers for connection to two wireless networks, typically a cellular transceiver and a short-range transceiver. The short-range transceiver is preferably a Bluetooth for connection to at least one external device. For communication purposes, the user prepares a list of external devices serving persons to be in touch with, and assigns IDs to the external devices. The IDs of the external devices are stored in the mobile device. The user further stores in the mobile device, a list of phone numbers (phone book information) of contacts on a network and associated with the external devices for delivery of messages to the selected external device(s) from that phone number. The user may assign several or even all phone numbers to a certain external device, which means that whenever a communication attempt (message) is made to reach said user (send a message), the phone forwards the attempt to the external device. Optionally, the user can change assigned phone numbers in the phone list. Periodically, the mobile device scans the network, and detects messages from contact source(s) associated with an external device. The messages are stored in the mobile device according to the Id of the external device. When the mobile device is within the coverage area of the external device and a short-range connection, typically Bluetooth established, the mobile device transmits the message(s) to the external device associated with the message. The external device interprets the message and provides an output, e.g. audio, video, display, etc. to the intended person.

In operation, the mobile device enters the connectivity area of an external device. The mobile device operating in a Bluetooth Scan Inquiry mode receives an Id of an external device. When the Id is recognized by the mobile device, the message(s) stored in the mobile device at the Id for the external device is/are transmitted to the associated external device via the Bluetooth connection. The message(s) are transmitted to the external device from the assigned phone number in a message format compatible for delivery via Bluetooth connection. Once connected to a mobile device in a "paired" state, the external device cannot receive messages from any other mobile devices than the currently assigned mobile device. The transfer to another mobile device is only possible when the "paired" mobile device releases the external device from the pairing status. The external device interprets the message and determines the mode of communicating the message (s), e.g. audio, video, display, etc. In one embodiment, a desktop puppet doll serves as an external device and can display or speak user incoming/outgoing calls and messages; provide current presence availability status and frequency of communications of the associated contact source. In another embodiment, an animated character(s) in an electronic screen serves as an external device and can be assigned different phone numbers used in a home environment for notification of user incoming calls and messages. In still another embodiment, a large LED display serves as an external device and can be linked to phone numbers of people in frequent contact with the user for display of messages considered appropriate for public display.

An aspect of the invention is a mobile phone having additional and personalized means to observe or feel connected to a certain person via an external device.

Another aspect is a mobile phone storing a list of Ids of external devices serving certain persons for delivery of messages to the person(s).

Another aspect is a user establishing a list of phone numbers for assignment to contact sources associated with external devices serving certain persons.

Another aspect is a mobile device linking phone numbers of contact sources with Ids of external devices.

Another aspect is a mobile device scanning and detecting on a network messages related to at least one contact or message source and associated with an external device Id.

Another aspect is a mobile device collecting messages from contact sources on a network and storing the messages by external device Id for delivery to a person(s) associated with the contact source.

Another aspect is a mobile device transmitting to the external device Id messages related to the at least one associated contact for interpretation in providing an output interface.

Another aspect is an external device having multiples modes of conveying information received from a mobile device.

DESCRIPTION OF DRAWINGS

The invention will be further understood from the following description of a preferred embodiment taken in conjunction with an appended drawing, in which:

FIG. 3 is a representation of a mobile device coupled to a long-range network and to an external device via a short-range transmission link when within the coverage of the external device;

FIG. 3A is a representation of software stored in the mobile device for implementing the system of FIG. 1;

FIG. 3B is a table of message stored in the mobile device by external device Id;

DESCRIPTION OF PREFERRED EMBODIMENT

Figure 1:
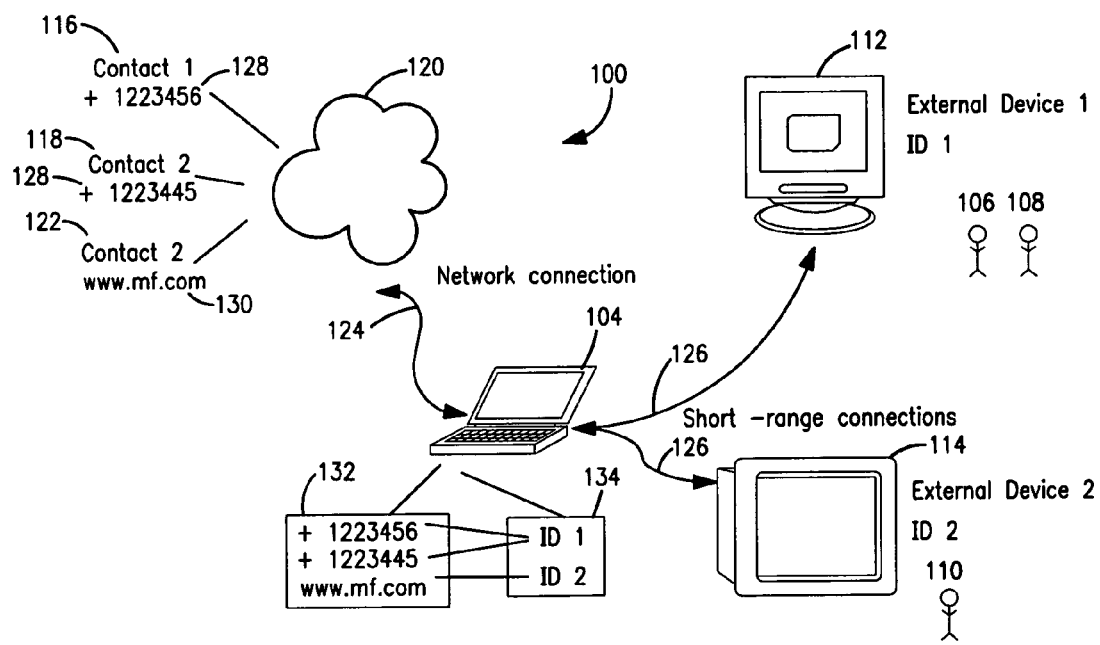
FIG. 1 is a representation of a system incorporating the principles of the present invention and enabling a mobile device to keep in touch with a certain person(s) by detecting messages on a network from a contact source associated with the certain person for delivery via an associated external device.

FIG. 1 discloses a system 100 enabling a user (not shown) operating a mobile device (MD) 104 to be in touch with certain parties, for example a friend 106, a family member 108 and a business associate 110 via external devices 112 and 114, respectively. The mobile device delivers messages from contact sources 116–122 via the network connection 124 and short-range connection 126 to the external device 112 for the friend or family member or the like associated with the contact source. Likewise, the contact source 120 delivers messages via network connections 124, 126 to the external device 2 for the business associate 110 associated with the contact source. The contact sources maybe any terminal on a telephone network or distributed information network or LAN outputting information relating to or of interest to a person(s) served by an external device. The contacts are assigned a phone number by the user and messages coming from such terminal are recognized by the mobile device. In one example, the message may be a business traveler advising his/her family of his/her traveling status. In another example, the message may be a radio or video broadcast, which the person follows, and would have an interest in receiving the message. Many other examples could be described of a user scanning a network to detect message associated with a person at an external device and by so doing keeps in touch with the person associated with the contact source. The messages are linked to an Id associated with the external device for delivery to a certain person served by the external device, as will be further described hereinafter.

The mobile device includes a first long-range transceiver coupled to the network 120 by a network connection 124. A short-range transceiver couples the mobile device to the external devices 112, 114 via a short-range connection 126, 126', typically Bluetooth. It should be noted that also other types of short-range connections are applicable, such as, for example Wireless LAN (WLAN) and Ultra Wideband (UWB). The user assigns each contact source at least one phone number 128, 128' or a network address 130. Optionally, the user can change a phone number once assigned. A table 132 is established in the mobile device by the user. The table stores the contact information, such as, for example phone numbers and Internet addresses of the contact sources assigned by the user. The user also assigns identification (Id) to each external device and stores the Id in a table 134. The Id's in table 134 are linked to the phone numbers in table 132.

Figure 2:
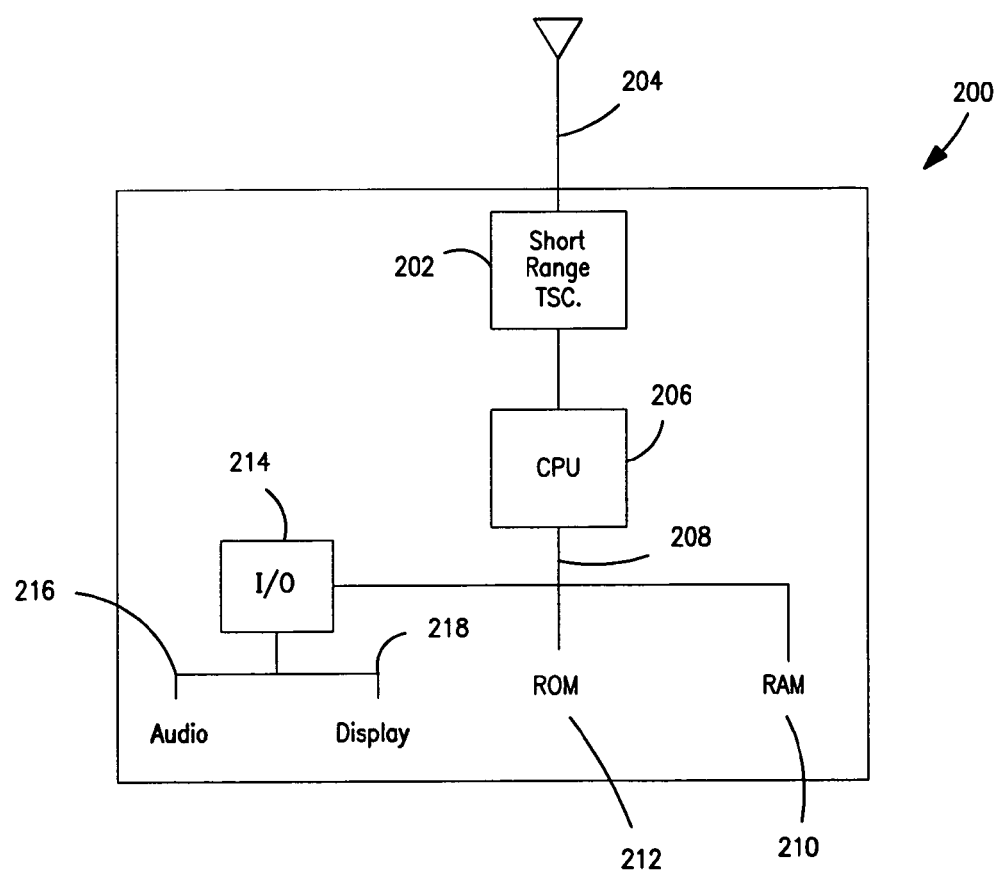
FIG. 2 is a representation of a block diagram of an external device in FIG. 1 functioning in a short-range communication system.

FIG. 2 describes the details of an external device 200, representative of the external devices 112, 114 included in the system 100. The external device 200 can be a wide range of products to provide an appropriate output e.g. audio, video, display, etc. to a recipient. The basic elements of the external device 200 include a short range transceiver 202 linked to a RF antenna 204 and to a central processing unit 206. A busbar 208 connects the CPU to a RAM 210, a ROM 212 and an I/O circuit 214. The I/O circuit includes an audio output 216 and a visual or display output 218. Software is installed in the ROM for processing received communications and activating the audio output or the display output. In the case of the display, software is included in the ROM for providing programmable actions in response to receiving information from the mobile device.

In operation, the short-range transceiver, typically Bluetooth enabled is activated to conduct an inquiry process to discover all Bluetooth enabled devices in its coverage area, typically up to 10 meters. When an external device enters the coverage area, the mobile device will supply frequency hop synchronization packets to allow the external device to synchronize with the mobile device. To establish a connection with the mobile device, the external device enters a page state where it transmits paging messages directed at the mobile device. The mobile device acknowledges the paging message and the external device responds with a FHS packet. The mobile device updates its' timing and synchronous reference and enters the connection state with the external device. Additional details on establishing a Bluetooth connection between the mobile device and the external device are described in the text "Bluetooth—Connect Without Cables", J Bray, et al, published by Prentice Hall PTR, Upper Saddle River, N.J., USA, Second Edition, 2002, Chapter 5. On entry to the connection state, various data changes occur between the mobile device and the external device. The external device interprets the data packets sent by the mobile device and translates them into I/O signals for the audio or display output, as required. Where the received message includes digital voice signals, the signals are directed to the audio output 216. Where the received signals are text, the signals are directed to the display 218.

Figure 2A:
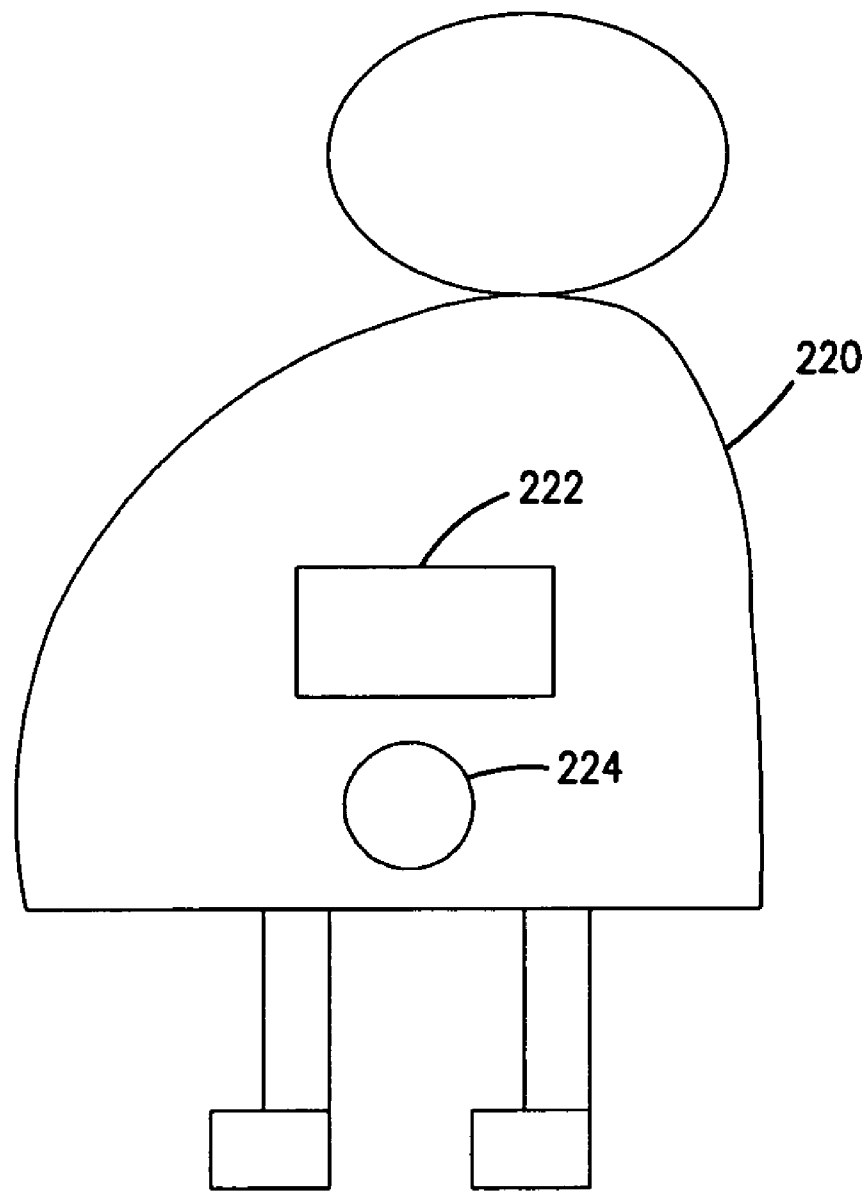
FIG. 2A is a representation of an external device of FIG. 2 embodied in an electronic toy.

In one embodiment, shown in FIG. 2A, the external device may be an electronic toy 220, e.g. a doll including a display 222 and an audio speaker 224. The display 222 under control of the CPU 206 (FIG. 2) displays incoming/outgoing calls and messages, time present availability status of contact sources and the frequency of communication of an associated contact 116, 118 in the network 120. The audio speaker provides an audio output from digital signals translated by the CPU using appropriate software.

Figure 2B:
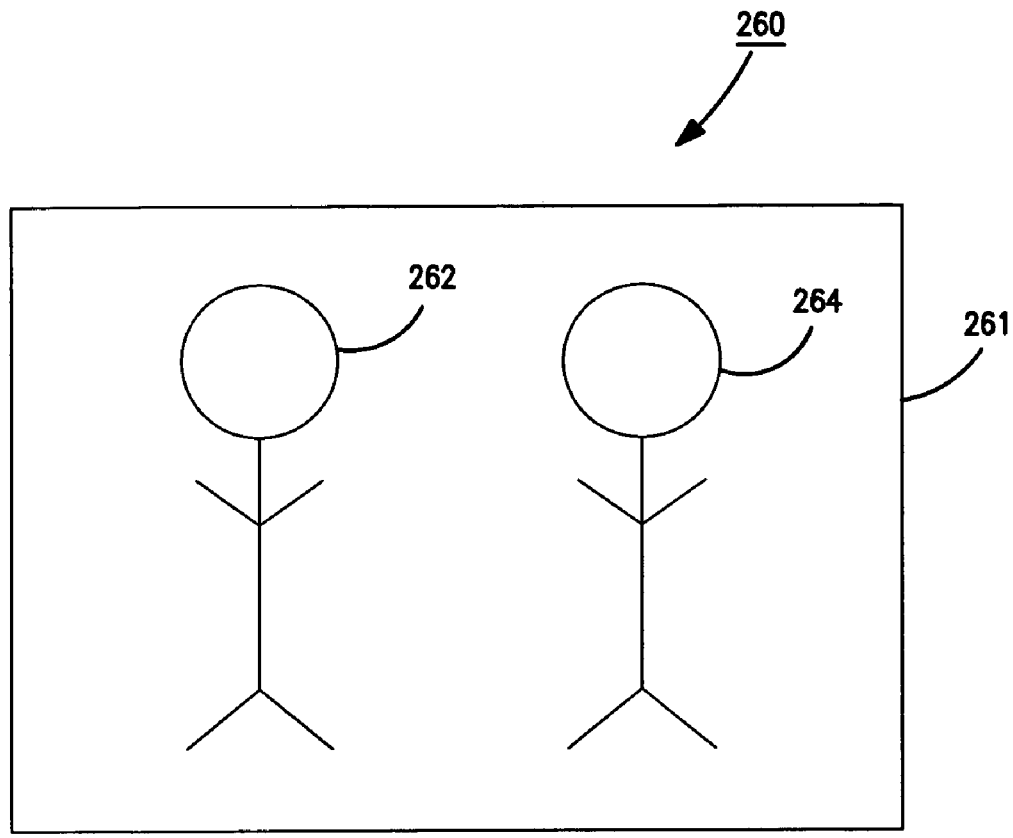
FIG. 2B is a representation of an external device of FIG. 2 embodied in an animated display.

In another embodiment, shown in FIG. 2B, the external device may be an animated character display 260 within a frame 261 and having several characters 262, 264, each of which can be assigned to a phone number of a contact source by the mobile device. The animated characters can be used in a home environment as a better notification method for the mobile phones incoming calls/messages. A specific character can be assigned to a specific number or call group. A general character may be provided to handle the remainder of phone numbers, not assigned to a specific character. A user can be notified of a new phone call or message by looking at the display after being absent from the display. When there is no phone calls/messages, the characters can show the status of related persons in a slow or static motion. The user can configure the characters behavior with a phone application (not shown) included in the frame.

Figure 2C:
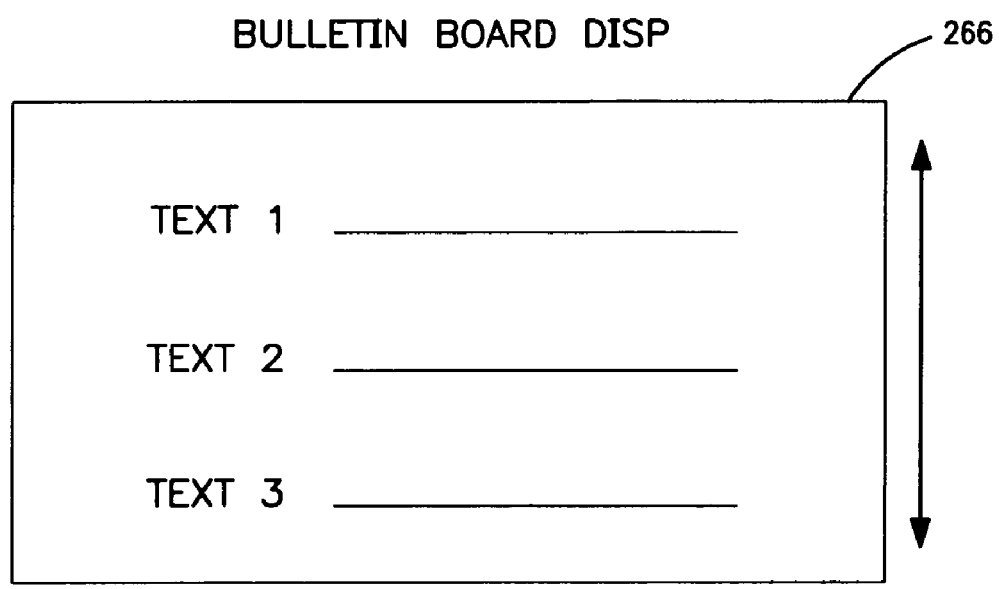
FIG. 2C is a representation of an external device of FIG. 2 embodied in an electronic bulletin board.

In still another embodiment, shown in FIG. 2C, the external device may be a large LED display 266 adapted to display certain numbers and alphabets, and is linked to phone numbers of contact people who are in frequent contact with the user. Text messages 1, 2, 3 from contact sources can be displayed to the recipient by scrolling the text. The display can blink the light to indicate incoming calls and messages.

FIG. 3 discloses a mobile device 300, representative of the mobile device 104 shown in FIG. 1 within the coverage area of an external device 308. The device 300 includes an antenna 302 coupled to a network terminal 304 via air link 306, and a second antenna 306 coupled to the external device 308 via an antenna 310 and air link 312. The antenna 302 is connected to a network transceiver 314 within the mobile device. Likewise, the antenna 306 is connected to a short-range transceiver 316 within the mobile device. The transceivers 214 and 316 are connected to an I/O circuit 318 providing an input to a central processing unit 320. The I/O includes an input from a keypad 321 included in the mobile device. A busbar 322 connects the CPU to a RAM 323 and a ROM 324. A power supply 326, typically a battery, provides the energy for the mobile device and the transmission of RF signals via the airlinks 306 and 312.

The ROM 324 stores operating software 328, shown in FIG. 3A, including an operating system 330; network protocol 332 for connecting the mobile device to the network 120 for communication purposes; Bluetooth protocol 334 for connecting the mobile device to the external device for communication purposes and message scan/detect software 336 for collecting messages on the network 120 and associated with an external device, and application software 338 implementing various mobile device functions. The ROM further includes storage area for a table 340 listing messages 342 received by the mobile device after scanning the network and associated Ids 344 for the messages. For example, message 1, detected by the mobile device, is associated with external device 1 based upon the results of matching tables 132 and 134 (FIG. 1). Similarly, message 2 is associated with external device 2 based upon matching tables 132 and 134. In some instances, a message maybe associated with multiple external devices according to the matching of tables 132 and 134.

Figure 4:
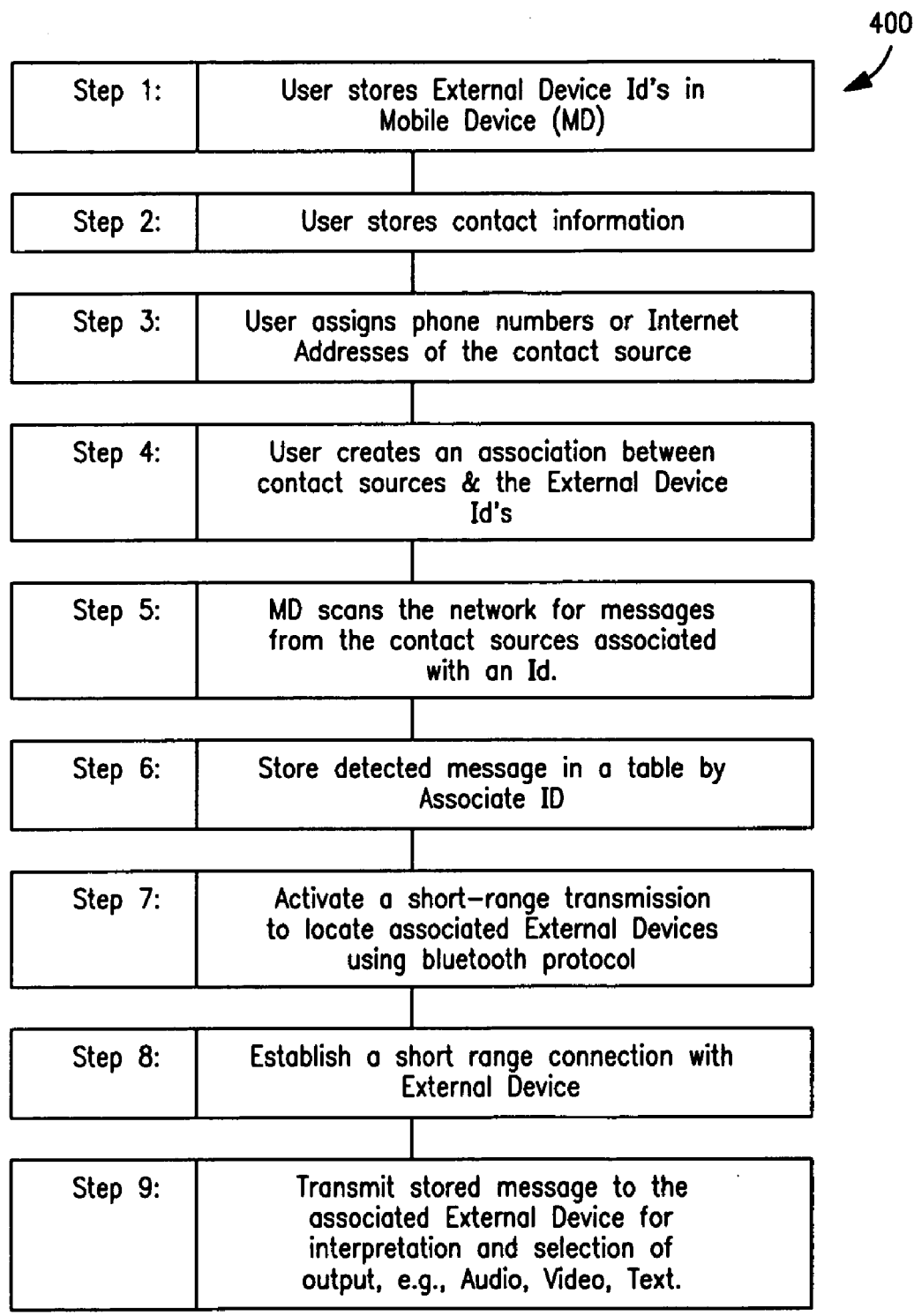
FIG. 4 is a flow diagram for the operation of one embodiment of the system of FIG. 1.

FIG. 4 describes a process 400 enabling a mobile device (MD) to communicate messages from a contact source on a network to an external device serving a person associated with the contact source, as follows:

Step 1: The process is entered by the user storing in a MD at least one Id of an external device.

Step 2: User stores information in MD of contact sources on a network.

Step 3: User creates an association between the contact sources and the external device Ids stored in the MD.

Step 4: User assigns and stores in the MD a phonebook containing phone numbers or Internet addresses of the contact sources.

Step 5: MD scans the network for messages from contact sources associated with Ids.

Step 6: MD stores the messages in a table with the associated Id.

Step 7. MD activates a short-range transmitter to discover associated external devices within the coverage area of the transmitter.

Step 8: MD establishes a short-range connection with an external device having an Id matching a stored message.

Step 9 MD transmits messages related to the at least one contact source with the Id to the external device for interpretation by the external device and selection of output, e.g. audio, video, text, etc.

Figure 5:
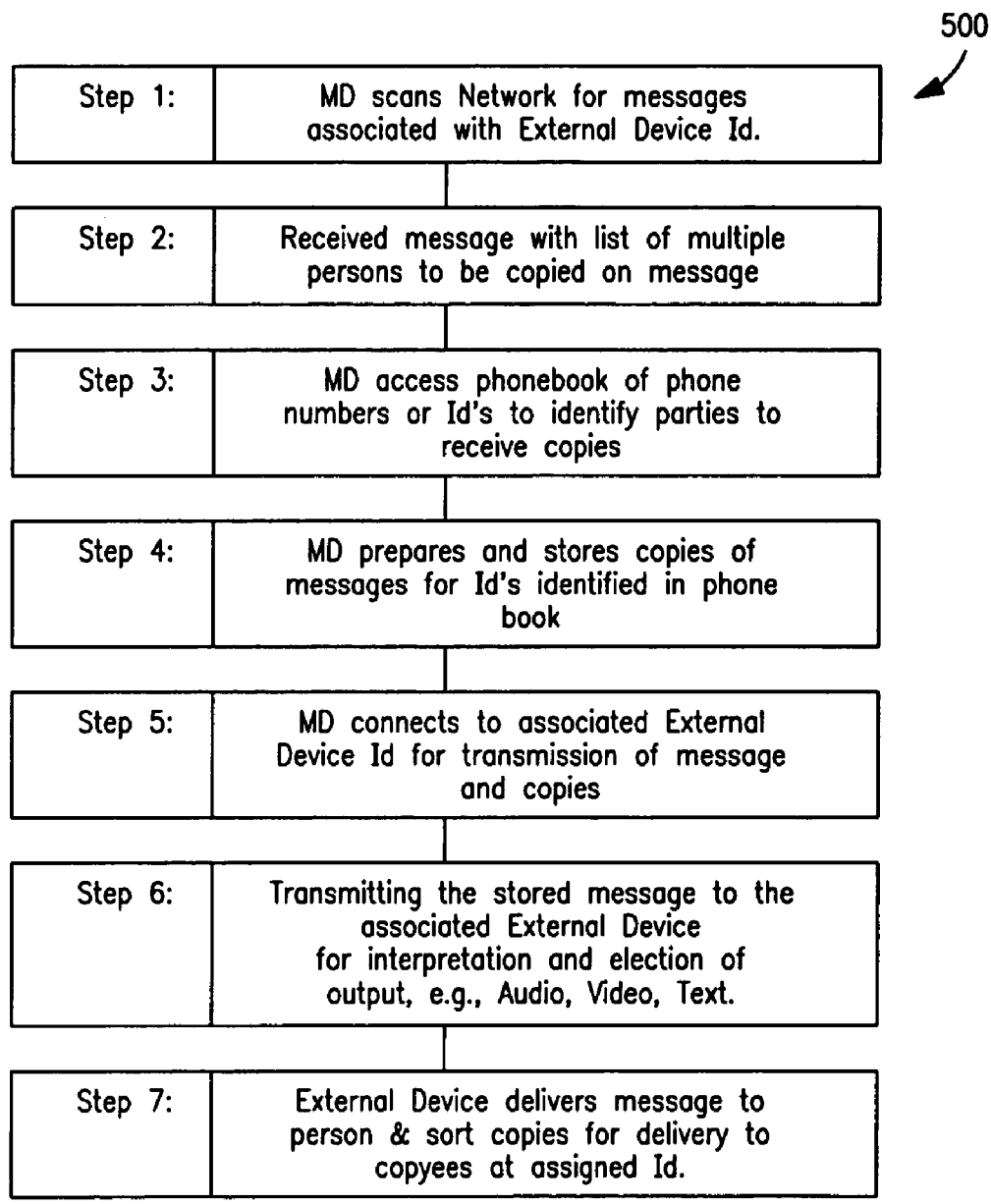
FIG. 5 is a flow diagram for the operation of another embodiment of the system of FIG. 1.

FIG. 5 discloses another process 500 enabling a mobile device to receive messages from a contact source for distribution to multiple parties served by at least one external device, as follows:

Step 1: MD scans the network for messages associated with an Id.

Step 2: Received message lists multiple parties to be copied on the message.

Step 3: MD accesses a stored phonebook of phone numbers and Ids to identify parties to receive the copies.

Step 4: MD prepares and stores copies of the message for the Ids.

Step 5: MD identifies and connects to an Id at external device for transmission of the stored messages.

Step 6: The external device delivers the message and copies to external devices serving the copyees.

Summarizing, each external device that is made as an extension of a MD has the connectivity to the MD. The external device has one or more display capabilities that can display information that is coming from the MD. The MD looks for recognizes the external object that is going to be assigned with a phone number, when it is brought nearby within the range of the connectivity mechanism and is turned on. When the external device is recognized by the MD with a unique Id, the user selects a phone number from the ones available in the phonebook. The phone number can be a caller group, or multiple phone numbers of user's selection instead of a single number. The selected phone number is linked to the external device with the recognized Id.

In the MD, the activities around the selected phone number are closely observed and possibly logged including (a) incoming and outgoing phone calls, messages; (b) presence availability information, etc. Furthermore, when other sensors become available in the MD, other types of information can be accessed and collected with regard to the phone number, e.g. activity level (motion sensor) location, future presence. The application software in the MD selects the relevant data about the phone number to the linked external device whenever a connection is available and valid. The display capability is taken into consideration when the MD determines the information to be sent to the external device. The information is interpreted by the external device so that the information can be displayed in an appropriate manner.

While the invention has been described in terms of a preferred embodiment, various changes can be made therein without departing from the spirit and scope of the invention, as defined in the attached appended claims, in which we claim:

1. A method for communicating between a mobile device and an external device, comprising:
    a) storing in a mobile device an external device list including at least one external device ID wherein the external device provides audio, video and/or visual display outputs as a dynamic bulletin board;
    b) maintaining in the mobile device contact information for associating at least one of the contacts with the at least one external device ID;
    c) creating an association between the at least one contact and the at least one external device ID;
    d) maintaining a network connection for receiving communications through the network;
    e) scanning received communications for identifying messages related to the at least one contact associated with the external device ID;
    f) detecting external devices providing IDs for short-range communication;
    g) transmitting messages related to the at least one contact associated with the external device ID to said external device when detecting the presence of said external device and within the range of the external device; and
    h) interpreting the message in the external device for appropriate audio video and/or visual display output.

2. The method of claim 1 further comprising
    i) distributing messages among multiple external devices linked together using assigned phone numbers.

3. The method of claim 1 further comprising
    j) providing programmable action in the external device in response to a received message.

4. The method of claim 1 further comprising
    k) changing a phone number assigned to a contact source associated with an external device.

5. The method of claim 1 further comprising;
    1) assigning at least two phone numbers to an external device.

6. The method of claim 1 wherein the network is a cellular network.

7. The method of claim 1 wherein the short range network is Bluetooth.

8. The method of claim 1 wherein the external device is taken from the group consisting of: a toy; an animated character display, an electronic billboard, and serves as the dynamic bulletin board for keeping in touch with persons associated with the contact source.

9. The method of claim 8 wherein a character in the animated character displays is assigned to a specific telephone number.

10. A mobile terminal enabling communication with an external device, comprising:
    a) a cellular network transceiver capable of communication within a cellular communications network;
    b) a short-range transceiver capable of communicating with external devices in a short-range network wherein the external devices provide audio, video and/or visual display outputs;
    c) a storage device;
    d) a processor, and
    e) software means operative on the processor for:
        1) maintaining in the storage device a database identifying a contact party for stored contact information and at least one external device linked to at least one contact party;
        2) scanning communications communicated via the cellular network transceiver for detecting communications relating to said identified contact party or parties; and
        3) transmitting information relating to the communications with the identified contact party to the at least one external device via the short range transceiver for interpretation of the information for selecting among available outputs when detecting communication relating to said identified contact party.

11. The mobile terminal of claim 10 further comprising:
    f) means for maintaining a list of phone numbers for assignment to contact sources.

12. The mobile terminal of claim 10 further comprising:
    g) means for changing a phone number to an external device in response to a communication for the contact party.

13. The mobile terminal of claim 10 further comprising:
    h) means in the external device for interpreting the communication for an appropriate display, wherein the display may be audio, video, visual as a dynamic bulletin board serving persons associated with contact sources.

14. The mobile terminal of claim 10 further comprising:
i) means for formatting the phone number in a short-range message format.

15. The mobile terminal of claim 10 further comprising:
j) means for detecting whether any of the external devices are within the coverage range of the short-range transceiver for purposes of transmitting at least one message to the external device from contact sources associated with the external device.

16. The mobile terminal of claim 10 further comprising:
k) means for assigning at least two phone numbers to an external device.

17. The mobile terminal of claim 10 further comprising:
l) means for receiving an ID of an external device.

18. The mobile terminal of claim 10 further comprising:
m) means for storing and matching in a first table an ID of an external device received in a message to an ID in a second table of the database for the external device wherein the message maybe associated with multiple external devices according to the matching of the first and second tables.

19. The mobile terminal of claim 10 further comprising:
n) means for monitoring the activities occurring on assigned phone number for the external device.

20. A system enabling a mobile terminal to assign a personal phone number to an external device for communication purposes, comprising:
a) a mobile terminal including a network transceiver; a short-range transceiver; a processor and a database for storing information;
b) an external device including a short-range transceiver, a processor for processing information received from the mobile device, and an output interface, wherein the external device provides audio, video and/or visual display outputs;
c) means for storing a list of IDs identifying external devices;
d) means for scanning the network and collecting information related to the IDs when within the range of an external device;
e) means storing the collected information by ID and assigned phone number; and an external device associated with at least one ID having stored collected information for interpretation and display of the collected information as an output.

21. The system of claim 20 further comprising:
g) means for linking the mobile device to the external device within the short-range coverage area of the external device.

22. The system of claim 20 further comprising:
h) means for matching the ID of the external device to the ID of the stored information.

23. The system of claim 22 further comprising:
i) means for transmitting the stored information via the short-range network to the external device associated with the ID matching the ID of the stored information.

24. The system of claim 23 further comprising:
j) external device means processing the transmitted stored information for appropriate output as a dynamic bulletin board serving persons associated with the collected information stored by ID.

25. A medium, executable in a computer, for communicating between a mobile device and an external device, comprising:
program instructions storing information of contact sources on a network in a mobile device (MD);
program instructions creating an association between the contact sources and the Ids of external devices stored in the mobile device wherein the external devices provide audio and/or visual display outputs;
program instructions assigning and storing in the MD a phonebook containing phone numbers or Internet addresses of the contact sources;
program instructions scanning the network for messages from contact sources associated with Ids when within the coverage area of the MD; and
program instructions storing the messages in a table with the associated Id; and
program instructions transmitting the messages of the identified contact party to at least one external device via the short range transceiver for interpretation of the messages and selecting among available outputs.

26. The medium of claim 25 further comprising:
program instructions activating a short-range transmitter to discover associated external devices within the coverage area of the transmitter.

27. The medium of claim 25 further comprising:
program instructions establishing a short-range connection with an external device having an Id matching a stored message.

28. The medium of claim 25 further comprising:
program instructions transmitting messages related to the at least one contact source with the Id to the external device for interpretation by the external device and selection of output mode, as a dynamic bulletin boards serving person associated with the contact sources.

29. The medium of claim 25 further comprising:
program instructions collecting a message associated with an Id of an external device and preparing copies of the message for multiple copiees of the message.

30. The medium of claim 29 further comprising:
program instructions transmitting the message and copies to the external device associated with the Id for distribution to the copiees.

* * * * *